United States Patent
Louart et al.

(10) Patent No.: US 6,887,543 B1
(45) Date of Patent: May 3, 2005

(54) THERMAL PROTECTION SHEATH AND ITS FABRICATION METHOD

(75) Inventors: Frédéric Louart, Pontpoint (FR); Jean Ferrand, Crepy-en-Valois (FR); Lionel Dromain, Crepy-en-Valois (FR); Dirk Steitz, Crepy-en-Valois (FR)

(73) Assignee: Federal Mogul Systems Protection Group, Crepy-en-Valois (FR)

( * ) Notice: Subject to any disclaimer, the term of this patent is extended or adjusted under 35 U.S.C. 154(b) by 0 days.

(21) Appl. No.: 09/890,530

(22) PCT Filed: Jan. 28, 2000

(86) PCT No.: PCT/FR00/00202

§ 371 (c)(1),
(2), (4) Date: Aug. 1, 2001

(87) PCT Pub. No.: WO00/46543

PCT Pub. Date: Aug. 10, 2000

(30) Foreign Application Priority Data

Feb. 1, 1999 (FR) .............................. 99 01099

(51) Int. Cl.[7] .............................. B29D 22/00
(52) U.S. Cl. .................... 428/36.9; 428/34.1; 428/35.3; 428/35.9; 428/36.91; 428/137; 428/152; 428/181; 138/118; 138/118.1; 138/121; 138/123; 138/127; 138/139; 138/153; 442/27

(58) Field of Search .................. 428/181, 152, 428/137, 36.9, 174, 34.1, 35.3, 35.8, 35.9, 36.91; 138/118–153, 121–139, 172; 442/27

(56) References Cited

U.S. PATENT DOCUMENTS

| | | | |
|---|---|---|---|
| 5,617,900 A | * | 4/1997 | Weil .............................. 138/127 |
| 5,660,899 A | | 8/1997 | Rockney et al. |
| 5,843,542 A | | 12/1998 | Brushafer et al. |

FOREIGN PATENT DOCUMENTS

| | | |
|---|---|---|
| EP | 0 157 956 | 10/1985 |
| GB | 2 249 151 | 4/1992 |

* cited by examiner

*Primary Examiner*—Nasser Ahmad
*Assistant Examiner*—Jane Rhee
(74) *Attorney, Agent, or Firm*—Young & Thompson

(57) ABSTRACT

A heat-reflective protective sleeve includes a substrate (10) and a sheet of reflective material (20) fixed on the substrate (10). The substrate (10) is elastically deformable from a non-operating position and the sheet (20) is pleated on the substrate (10) in the non-operating position.

3 Claims, 2 Drawing Sheets

US 6,887,543 B1

THERMAL PROTECTION SHEATH AND ITS FABRICATION METHOD

BACKGROUND OF THE INVENTION

The present invention relates to a thermal protection sheath and its fabrication method.

Thermal protection sheaths are routinely used to insulate fluid pipes, for example in automobile vehicles, and in particular in hydraulic circuits, fuel lines, brake fluid lines, cooling fluid lines and conditioned air lines.

This kind of thermal protection sheath includes a substrate covered with a reflective material adapted to reflect infrared radiation.

The substrate must be sufficiently flexible to adapt to various shapes of pipe and cover them without creasing.

A first technique for covering the substrate with a reflective material consists in applying a coating containing particles of aluminum, for example, directly to the outside surface of the substrate.

This kind of aluminized coating preserves good flexibility of the substrate of the protective sheath but has limited reflection properties. This is because the binder used to fix the aluminum particles to the surface of the substrate absorbs some thermal radiation and thereby limits the reflective power of the aluminized coating.

A second technique consists in fixing a reflective foil, such as aluminum foil or aluminized film, to the outside surface of the substrate.

These foils and films improve the thermal protection provided by the sheath but lack flexibility. In particular, the foils tend to tear if the sheath is deformed, and in particular if it is stretched.

U.S. Pat. No. 5,660,899 describes a thermal protection sheath comprising a substrate formed by a corrugated plastics material tube covered with a laminated structure glued at all points to the outside surface of the substrate.

The laminated structure and the substrate therefore have exactly the same corrugated tube form and the laminated structure and the substrate are in contact over their entire surface.

SUMMARY OF THE INVENTION

An object of the present invention is to propose a flexible and deformable thermal protection sheath having satisfactory heat-reflecting properties.

The thermal protection sheath according to the invention includes a substrate and a reflective foil fixed to the substrate, the substrate being elastically deformable from a relaxed configuration.

According to the invention the foil is pleated on the substrate in said relaxed configuration.

The reflective foil is therefore pleated on the elastic substrate in order not to impede deformation of the thermal protection sheath, which can therefore be fitted without difficulty to pipes of various shapes, and in particular bent pipes.

This is because the foil, forming pleats on the substrate, is in contact with the outside surface of the substrate only at certain points and has an external shape different from that of the substrate.

The pleated structure of the reflective foil absorbs deformation of the sheath, the reflective foil becoming respectively more pleated or less pleated as the sheath is compressed or stretched.

The pleats in the reflective foil on the substrate are advantageously adapted to form reserves of air that further improve the thermal insulation of pipes protected by the sheath.

According to one preferred feature of the invention, the substrate has an outside surface provided with openings and the foil is pleated in line with said openings.

Accordingly, on elastic deformation of the sheath, the shape of the openings is modified and the reflective foil can be pleated more or pleated less in line with these openings.

Preferably, the foil is pleated inside the openings.

This further improves the mechanical strength of the thermal protection sheath, the foil forming substantially no pleats projecting on the outside surface of the sheath. The thermal protection sheath therefore has improved resistance to contact wear.

In another aspect, the present invention provides a method of fabricating a protection sheath including a substrate and a reflective foil adapted to be fixed to said substrate.

According to the invention, the fabrication method includes the following steps:

elastically stretching the substrate from a relaxed configuration;

fixing the reflective foil to the stretched substrate; and elastically shrinking the substrate into said relaxed configuration.

This fixing the reflective foil directly to the stretched substrate forms the pleats when the substrate shrinks elastically.

Thus the elastic properties of the substrate are used to form the pleats in the reflective foil.

In accordance with one advantageous feature of the invention the shrinking of the substrate covered with the reflective foil is forced by means of rollers adapted to press said foil onto the substrate.

The rollers therefore hold the foil in contact with the outside surface of the substrate even when the latter shrinks, in particular radially.

In accordance with a preferred feature of the invention the foil is pleated inside openings in the substrate during the shrinkage step.

As previously described, the pleats formed by the foil are formed inside the openings in the substrate and do not project from the thermal protection sheath.

According to one advantageous feature of the invention, the substrate includes braided or knitted heat-shrink threads and during the step of shrinking the substrate the sheath is heated to shrink the heat-shrink threads.

Thermal shrinkage of the sheath facilitates the formation of pleats in the foil on the substrate.

Other features and advantages of the invention will become more apparent in the course of the following description.

BRIEF DESCRIPTION OF THE DRAWINGS

In the accompanying drawings, which are provided by way of non-limiting example.

DESCRIPTION OF THE PREFERRED EMBODIMENTS

Figure 1:
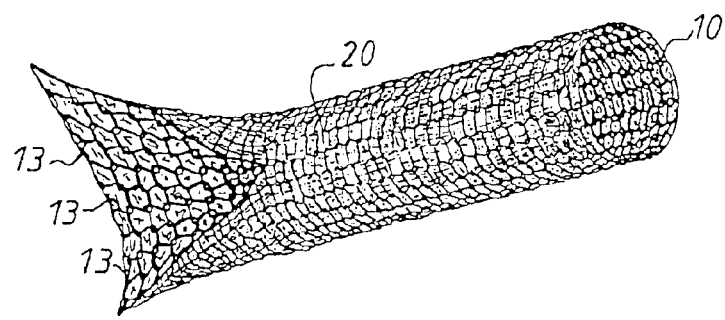
FIG. 1 is a front view of a thermal protection sheath in accordance with a first embodiment of the invention.
Figure 2A:
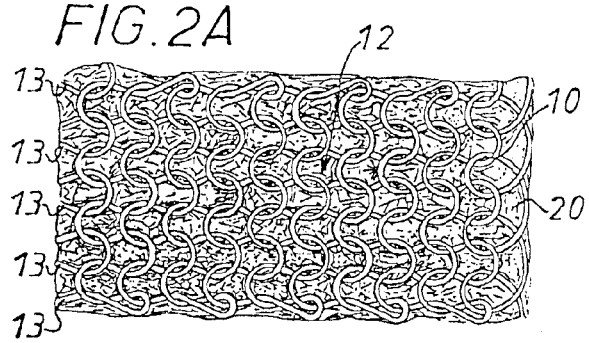
FIG. 2A is a perspective view of a portion of the sheath shown in FIG. 1.
Figure 2B:
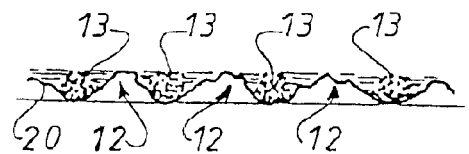
FIG. 2B is a view in cross section of the sheath portion shown in FIG. 2A.

A thermal protection sheath according to a first embodiment of the invention is described first and with reference to FIGS. 1, 2A and 2B.

The sheath includes a substrate 10 and a reflective foil 20 fixed to the substrate 10.

In this example the substrate is tubular and is formed from knitted threads 13.

Because of the knitted structure of the substrate, the latter has a capacity for elastic expansion in the longitudinal and radial direction. It is therefore elastically deformable, which facilitates fitting it over the pipe to be protected, and can be adapted to diverse pipe shapes.

The textile can be knitted directly in tubular form, to form a tubular substrate 10, or knitted flat and only afterwards rolled to form a tube.

Any material can be used for the threads, in particular glass fibers, polyamide fibers or polyester fibers.

The substrate 10 is therefore a textile substrate, with openings 12 between the threads 13.

As shown in FIG. 1, the substrate 10 has an outside surface provided with openings 12 thanks to the meshes formed by the knitted threads 13.

In accordance with the invention, a reflective foil 20 is fixed to the substrate. The foil 20 forms pleats on the outside surface of the substrate 10 in the rest position shown in FIG. 1.

As shown better in FIGS. 2A and 2B, the foil is fixed to the fibers 13 of the substrate 10 and is pleated inside the existing openings 12 between the knitted threads 13.

The foil 20 therefore forms small irregular pleats in the openings 12, disposed in all directions on the outside surface of the substrate 10.

The reflective foil 20 is woven from aluminized glass fibers, for example. It is therefore not elastically deformable in itself, but, thanks to its pleated structure on the substrate 10, it does not impede elastic deformation thereof, and consequently elastic deformation of the thermal protection sheath. The pleats in the reflective foil 20 prevent the sheath from tearing.

When the thermal protection sheath shown in FIGS. 1, 2A and 2B is fitted to a fluid pipe, such as a hydraulic pipe, for example, the pleats of the reflective foil 20 in line with the openings 12 in the substrate 10 form reserves or pockets of air on the outside surface of the pipe and therefore improve its thermal insulation relative to surrounding sources of heat.

Figure 3:
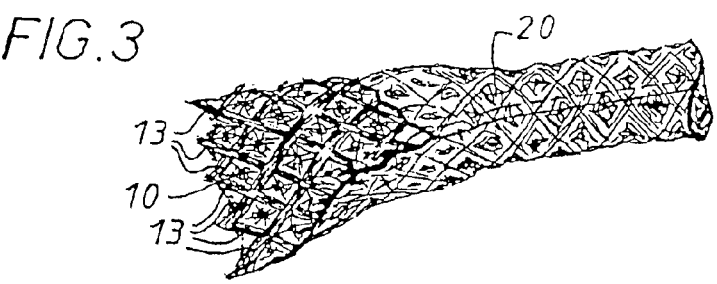
FIG. 3 is a perspective view of a thermal protection sheath according to a second embodiment of the invention.

Of course, the substrate 10 could equally be made from various textile materials, and in particular formed from braided threads 13, as shown in FIG. 3.

The threads used can be monofilament threads or multifilament threads and the braided textile preferably includes a mixture of monofilament threads and multifilament threads to confer on it good mechanical strength combined with great elasticity.

In this case, the elastic expansion can be radial, when the braided substrate is compressed longitudinally, or longitudinal, when the braided substrate is stretched longitudinally.

Figure 4:
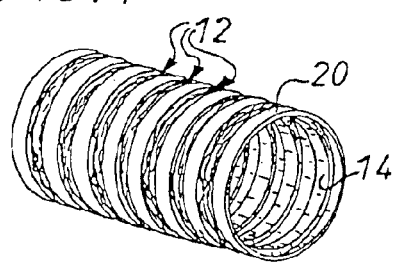
FIG. 4 is a perspective view of a thermal protection sheath according to a third embodiment of the invention.

A thermal protection sheath according to a third embodiment of the invention is described next with reference to FIGS. 4 and 5.

In this example, the substrate is in the form of a corrugated plastics material tube 14.

The corrugated plastics material tube can be slit longitudinally before applying the reflective foil 20.

The substrate 14 has an outside surface 11 provided with openings 12 in line with the annular recesses 12 in the corrugated tube 14.

Figure 5:
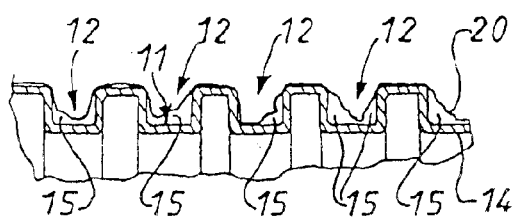
FIG. 5 is a view in longitudinal section of the thermal protection sheath shown in FIG. 4.

AS shown clearly in FIG. 5, a reflective foil 20 fixed to the outside surface 11 of the substrate 14 is pleated opposite the openings 12, inside the annular recesses 12.

Because of its corrugated structure, the substrate 14 can be stretched elastically in the longitudinal direction.

Accordingly, when it is stretched in the lengthwise direction, it is able to deform at the level of the annular recesses 12 in particular because of the pleated structure of the reflective foil 20 inside the annular recesses 12.

In this embodiment, as shown in FIG. 5, the pleats formed by the reflective foil 20 inside the annular recesses 12 create reserves or pockets of air 15 on the outside surface 11 of the substrate 10. These reserves 15 of air further improve the thermal insulation capacity provided by the sheath when fitted to a pipe.

The pleats formed in the annular recesses 12 are also irregular in shape and in orientation inside the annular recesses 12.

The various embodiments of the protection sheath can be slit longitudinally to facilitate fitting the sheath to a pipe. It is easier to slit the corrugated substrate longitudinally before applying the reflective foil.

The sheath has an inside diameter from 5 mm to 65 mm, for example.

A method of fabricating a thermal protection sheath according to the invention is described next, firstly with reference to FIG. 6.

In this example, the substrate 10 is a braided textile tube. Of course, an analogous fabrication process can be used for a different substrate, and in particular a substrate in the form of a corrugated tube 14, preferably slit-longitudinally, or a knitted textile substrate.

The fabrication method includes firstly a step of elastically stretching the substrate 10 from a relaxed configuration.

Here the braided substrate 10 is elastically stretched in the radial direction.

The substrate 10 can be stretched elastically along a continuous line by passing the substrate over a cylindrical mandrel whose diameter is greater than the inside diameter of the substrate 10 in the relaxed configuration.

In the case of a knitted structure, as shown in FIGS. 1, 2A and 2B, the substrate 10 is elastically stretched in the longitudinal and radial directions to increase its length and its radius.

In a second step of the fabrication process the reflective foil 20 is fixed to the stretched substrate 10.

In this embodiment, the reflective foil 20 is laminated onto the substrate 10 in the lengthwise direction of the substrate 10.

In this example two strips of reflective material 20 are fixed to two opposite faces of the expanded substrate 10.

Figure 7:
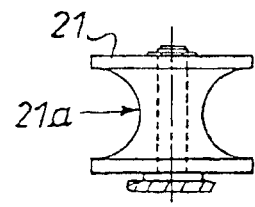
FIG. 7 shows diagrammatically rollers used in the fabrication method according to the invention.

As shown in FIG. 7, rollers 21 with a concave profile 21a are adapted to apply a strip of reflective material to a respective half-circumference of the expanded substrate 10.

Figure 6:
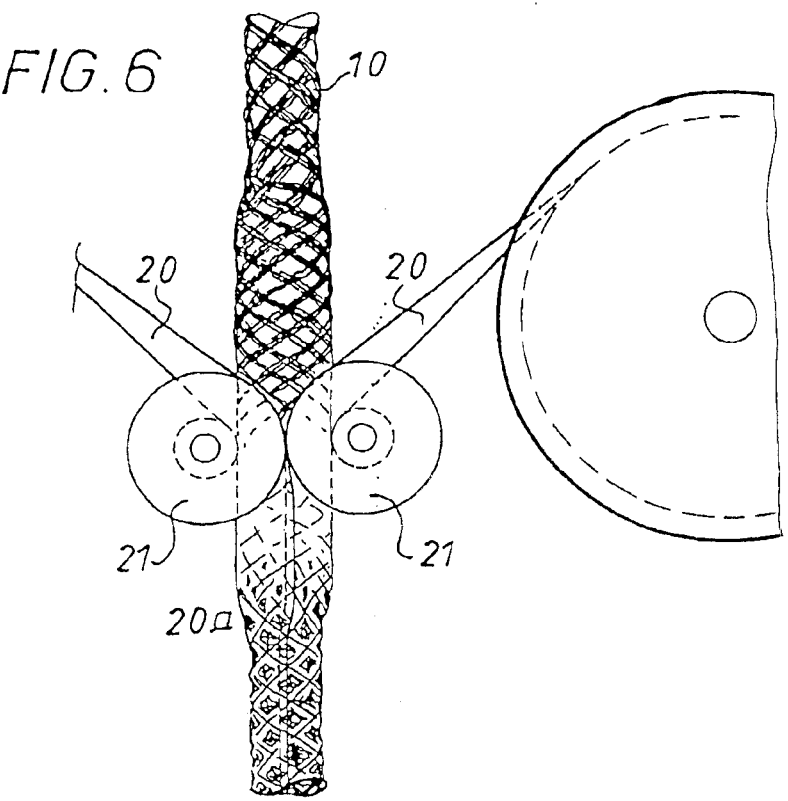
FIG. 6 shows a fabrication method according to a first embodiment of the invention.

FIG. 6 shows a small area 20a of overlap providing a perfect joint between the two strips of reflective material 20 on the substrate 10.

Of course, a different number of strips and rollers 21 for applying them to the substrate 10 could be used, in particular four rollers disposed in quadrature about the tubular substrate 10 and in pairs in two transverse planes offset lengthwise of the tubular substrate 10.

Figure 8:
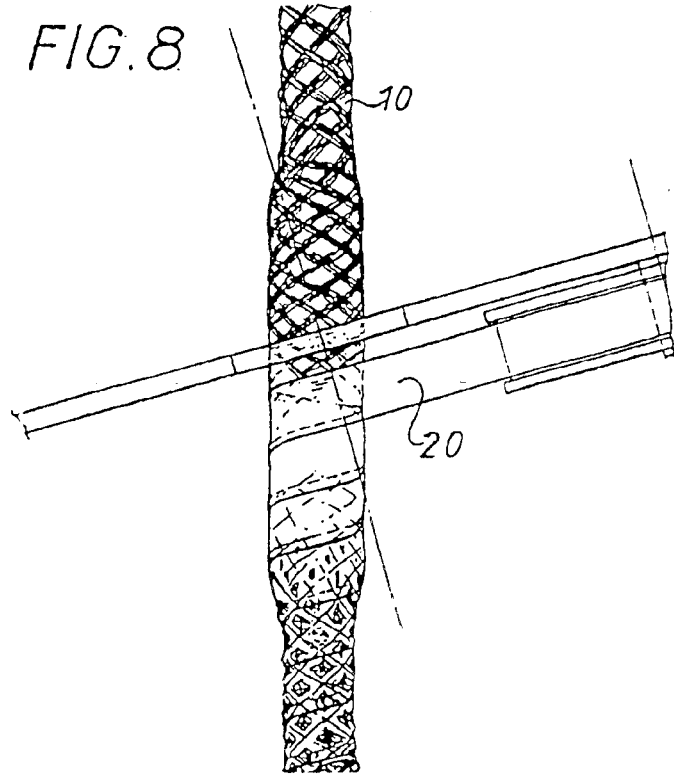
FIG. 8 shows a fabrication method according to a second embodiment.

As shown in FIG. 8, when fixing the reflective foil 20 to the stretched substrate 10, the foil 20 could equally be applied in a helix around the substrate 10.

The reflective foil 20 is fixed to the substrate 10 by means of an adhesive.

In the conventional way, that adhesive can be a thermoplastic or thermosetting glue or a pressure-sensitive adhesive.

Hot air jets or heated rollers 21 can be used if the adhesive must be heated to glue the reflective foil 20 to the substrate 10.

A double-sided adhesive can be applied to the reflective foil 20 before fixing it to the substrate 10. Alternatively, a double-sided adhesive can be applied directly during lamination of the reflective foil 20 to the substrate 10, between the foil 20 and the substrate 10.

The substrate 10 then shrinks elastically into its relaxed configuration on leaving the mandrel used during stretching it and fixing the reflective foil 20.

The elastic shrinkage can be unforced and obtained simply by the elastic return of the stretched substrate to its relaxed configuration.

Figure 9:
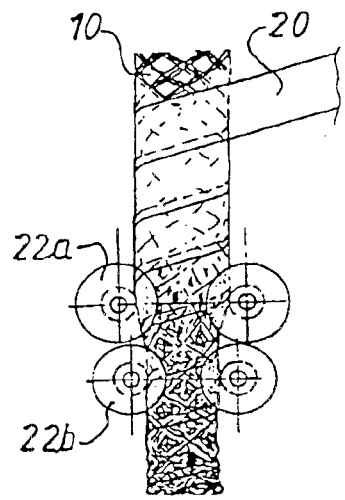
FIG. 9 shows a shrinkage step in a preferred embodiment of the fabrication method according to the invention.

As shown in FIG. 9, the elastic shrinkage of the substrate 10 covered with the reflective foil 20 can be forced by means of rollers 22a, 22b adapted to press the foil 20 onto the substrate 10.

In this embodiment, two pairs of rollers 22a and 22b are used, disposed along the path of the thermal protection sheath after leaving the mandrel.

The rollers 22a and 22b have a semicircular concave profile similar to that of the rollers 21 used for fixing the foil 20 and shown in FIG. 7.

The radius of the semicircular profile of the rollers 22a and 22b decreases in the direction in which the thermal protection sheath moves on leaving the mandrel to accommodate radial shrinkage of the elastic substrate 10.

Furthermore, the speed of the rollers 22a that are on the upstream side relative to the direction of movement of the thermal protection sheath on leaving the mandrel is higher than the speed of the downstream rollers 22b.

The speed ratio provides some lengthwise shrinkage of the substrate 10 on leaving the mandrel.

The rollers 22a and 22b therefore facilitate elastic shrinkage of the substrate 10 and adhesion of the reflective foil 20 to the substrate 10.

Also, the foil 20 is introduced into and pleated inside the openings in the substrate during this shrinkage step so that the pleats formed do not project from the substrate 10 but instead lie inside the openings 12.

If the substrate includes braided or knitted heat-shrink threads, during the step of shrinking the substrate 10 the sheath can preferably be heated to shrink the heat-shrink threads.

The rollers 22a and 22b used during this shrinkage step can therefore be heated.

The invention provides a thermal protection sheath having a good capacity for elastic stretching limited only by elastic stretching of the substrate 10 itself or unpleating of the reflective foil 20.

Of course, many modifications can be made to the embodiment described above without departing from the scope of the invention.

In particular, the substrate can be stretched longitudinally and/or radially during the stretching step.

Also, during elastic shrinkage of the substrate, the thermal protection sheath could travel over a path defined by rods curved in all directions in space to ensure uniform shrinkage of the substrate 10 and uniform pleating of the reflective foil 20.

The number of rollers 22a, 22b used when shrinking the sheath can be less than or greater than the two pairs of rollers 22a, 22b described in the above embodiment.

The reflective foil used can be a foil made from any synthetic polymer that is metallized and in particular chromium-plated.

What is claimed is:

1. A thermal protection sheath, comprising:

an inner tubular substrate that has an exterior surface with a plurality of recesses therein, said substrate being longitudinally and radially elastically deformable between a relaxed configuration and an expanded configuration in which a length or a radius of said substrate is larger than in said relaxed configuration; and a reflective foil fixed to said substrate and contacting said exterior surface only intermittently so as to form air pockets, said reflective foil being arranged on said substrate to have a plurality of indentations that correspond to said plurality of recesses when said substrate is in said relaxed configuration and that disappear when said substrate is elastically deformed from said relaxed configuration to said expanded configuration.

2. The sheath of claim 1, wherein said substrate comprises a corrugated tube and said recesses are annular depressions in said exterior surface, and wherein said air pockets are in said annular depressions between said foil and said corrugated tube.

3. The sheath of claim 1, wherein said substrate comprises a woven material and said recesses are between threads of said woven material.

* * * * *